Sept. 25, 1923. 1,468,843
W. S. TOWNSEND
INDICATING ATTACHMENT FOR LIQUID DISPENSERS
Filed Dec. 15, 1922    2 Sheets-Sheet 1

Inventor:
Wm. S. Townsend
by Geo. R. Evans
Att'y.

Sept. 25, 1923.
W. S. TOWNSEND
1,468,843
INDICATING ATTACHMENT FOR LIQUID DISPENSERS
Filed Dec. 15, 1922
2 Sheets-Sheet 2
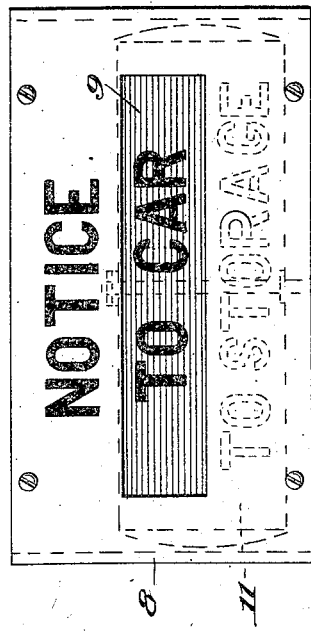
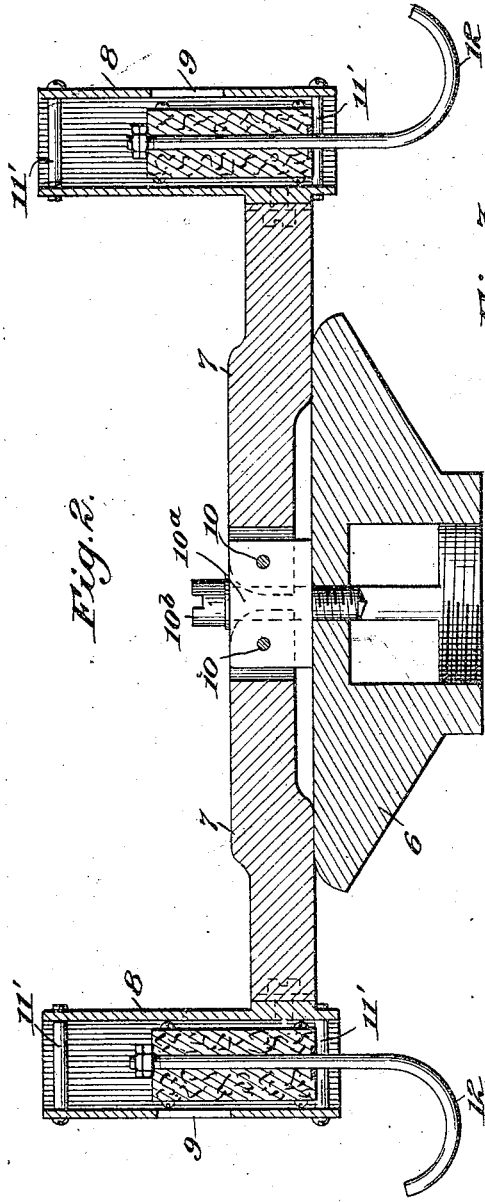
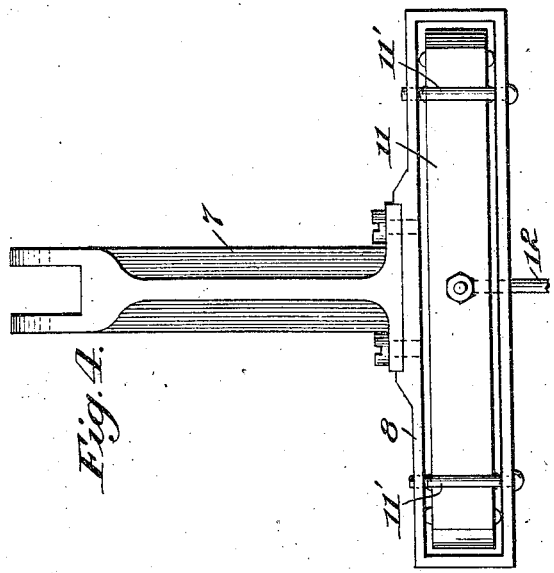

Patented Sept. 25, 1923.

1,468,843

UNITED STATES PATENT OFFICE.

WILLIAM S. TOWNSEND, OF ROCHESTER, PENNSYLVANIA, ASSIGNOR TO GUARANTEE LIQUID MEASURE COMPANY, OF ROCHESTER, PENNSYLVANIA.

INDICATING ATTACHMENT FOR LIQUID DISPENSERS.

Application filed December 15, 1922. Serial No. 607,213.

*To all whom it may concern:*

Be it known that I, WILLIAM S. TOWNSEND, a citizen of the United States, residing at Rochester, in the county of Beaver and State of Pennsylvania, have invented certain new and useful Improvements in Indicating Attachments for Liquid Dispensers, of which the following is a specification.

The invention relates to improvements in visible liquid measuring containers of the type provided with a measuring and overflow return tube.

The object of the invention is to provide the upper end of the measuring and overflow or return tube with means for indicating whether the outflow from the visible container is through its discharge pipe or back to the storage tank through the measuring tube.

This object I accomplish by the construction shown in the accompanying drawing, in which:

Figure 2 is an enlarged sectional side elevation of the indicating mechanism and the spreader to which same is attached.

Figure 3 is a detail face view of the indicator proper.

Figure 4 is a plan thereof.

Figure 1:
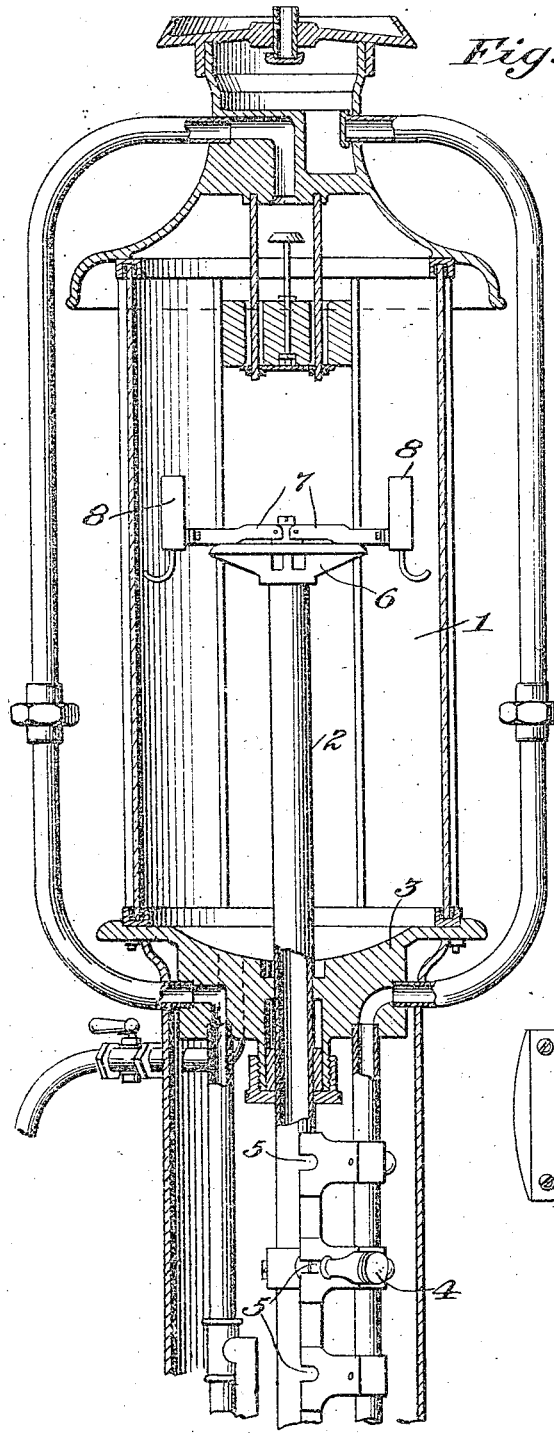
Figure 1 is a central vertical section of a visible liquid dispenser provided with my improved indicating device.
Figure 5:
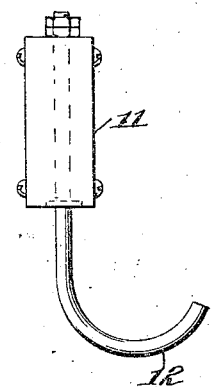
Figure 5 is an end elevation of the float.
Figure 6:
Figure 6 is a side elevation of the float.

The usual glass container 1 is shown provided with the vertically adjustable measuring and overflow tube 2, leading up through the bottom 3 of the container and provided with an operating handle 4 adapted to enter the properly spaced notches 5 spaced for one to five gallons. The top of the measuring tube 2 is provided with a spreader 6. These parts are well known in this type of machine and need not be further described. Through accident or otherwise, the operator, after having adjusted the tube to, say, for 5 gallons, might lower the tube so that the top of it is beneath the surface of the liquid, in which case a portion of the measured contents would flow back to the storage supply tank. To indicate such a proceeding to both the operator and the purchaser is the purpose of this invention, and it is accomplished by means of a simple indicating mechanism movable up and down with the measuring tube 2, and comprising one or more float-actuated indicators visible through the container 1. Such an indicator mechanism comprises an arm 7 secured to the top of the spreader extending horizontally therefrom and provided at its free end with an open ended float chamber 8 having a sight opening 9 in its outer vertical wall. The inner end of the arm 7 is pivoted at 10 to the spreader in case the bottom of the container is concaved, but will be rigidly secured where the bottom is flat. The pivot permits the arm to swing up out of the way when the tube 2 is moved down to its lowest position. The pivots 10 are carried by a support 10ª secured to the top of the spreader, or deflector by a screw 10.

Within the box-like flat chamber 8 is a freely movable float 11 resting on pins 11' or other support provided on its side next to opening 9 with an upper inscription "To car" and below this with the words "To storage." The float 11 is provided with a depending outwardly curved hook 12, which first comes in contact with the concave bottom and causes the hinged arm to rise without sticking or causing any undue strain.

Two of the indicator mechanisms are shown and they are visible from opposite sides of the container 1, but the indicator mechanism could be readily made visible from all points or from a single point, as may be desired. When the top of the measuring tube 2 is on a level with the measured quantity of liquid in container 1 and the overflow therethrough down to the tank has ceased the float 11 will rest on its support 11' and the words "To car" will be exposed through the opening 9 so that the purchaser may see that the liquid is flowing out through the discharge outlet in the bottom of the container 1, but should the operator lower the tube 2 below the level of the liquid the float 11 will rise and expose the words "To storage" and so warn the purchaser of the fact.

Obviously, various means of indicating this fact to the purchaser may be substituted for that shown without departing from the spirit of my invention.

What I claim is:

1. The combination in a liquid dispenser provided with a measuring chamber or container and an adjustable supply and overflow tube, of an indicating mechanism connected to the tube and actuated by the lowering of the tube into the measured body of liquid to warn the purchaser.

2. The combination in a liquid dispenser provided with an adjustable measuring and overflow tube, of a vertical movable float indicator connected to the upper open end of the tube and adapted to rise and expose a warning to the purchaser should the tube be lowered after the liquid reaches the level of its upper open end.

3. The combination in a liquid dispenser provided with an adjustable measuring and overflow tube, of a horizontal arm extending out from the upper open end of the tube, an open ended box vertically disposed upon the outer end of the tube and provided with a visual opening in its outer side, and a float mounted in the box and provided with indicia indicating, upon actuation of the tube, by the rise and fall of the float the point of discharge of the measured liquid.

4. The combination in a liquid dispenser provided with an adjustable measuring and overflow tube, of a vertically swinging horizontal arm pivotally connected to the upper end of the tube and provided at its outer free end with a vertically disposed open ended box having a visual opening in its outer wall, and a float mounted in the box and provided with indicating words to warn the purchaser as to the point of discharge of the measured liquid should the measuring tube be lowered improperly.

5. The combination in a liquid dispenser provided with an adjustable measuring and overflow tube, of a horizontal arm extending out from the upper open end of the tube, an open ended box on the outer end of the arm having an opening in its outer side, and a float mounted for vertical movement in the tube and provided with a depending outwardly curved hook at its lower end, and indicating means on the outer face visible through said opening in the box.

In testimony whereof I affix my signature.

WILLIAM S. TOWNSEND.